United States Patent

[11] 3,619,246

| [72] | Inventor | Robert A. Bragole<br>West Peabody, Mass. |
|---|---|---|
| [21] | Appl. No. | 823,964 |
| [22] | Filed | May 12, 1969 |
| [45] | Patented | Nov. 9, 1971 |
| [73] | Assignee | USM Corporation<br>Boston, Mass. |

[54] TREATMENT OF RESIN SURFACES TO IMPROVE THEIR RECEPTIVITY TO COATINGS AND THE LIKE AND RESIN BODIES WITH TREATED SURFACES
9 Claims, No Drawings

[52] U.S. Cl. .................................................. 117/47 A,
117/72, 117/93, 117/138.8 E, 117/138.8 F,
117/138.8 N, 117/138.8 UF, 117/161 ZA
[50] Field of Search ................................................. 117/47,
102, 118, 138.8 E, 93, 161 ZA, 72, 312, 138.8 UF,
138.8 F, 138.8 N

[56] References Cited
UNITED STATES PATENTS

| 2,893,896 | 7/1959 | Beeber et al. | 117/138.8 F X |
|---|---|---|---|
| 2,976,185 | 3/1961 | McBride | 117/138.8 F |
| 3,297,462 | 1/1967 | Fanning | 117/138.8 F X |
| 3,451,838 | 6/1969 | Burzznski et al. | 117/138.8 F X |
| 3,036,930 | 5/1962 | Grimminger et al. | 117/118 |
| 3,250,642 | 5/1966 | Parasacco et al. | 117/118 |
| 3,361,587 | 1/1968 | Menikheim et al. | 117/138.8 |
| 3,364,056 | 1/1968 | Seibel | 117/138.8 |
| 3,453,248 | 7/1969 | Gowdy et al. | 117/138.8 |
| 3,457,323 | 7/1969 | Stengle | 117/138.8 |
| 3,343,976 | 9/1967 | Matlock | 117/47 |
| 3,134,684 | 5/1964 | Northrop et al. | 117/47 |
| 3,297,462 | 1/1967 | Fanning | 117/63 |

*Primary Examiner*—William D. Martin
*Assistant Examiner*—William R. Trenor
*Attorneys*—W. Bigelow Hall, Richard A. Wise and Benjamin C. Pollard

ABSTRACT: Resin materials having low-surface energy are treated to increase their surface receptivity towards coatings and the like by providing a photosensitizer at the surface of the resin, subjecting the surface to ultraviolet radiation and applying a silane or siloxane to the surface prior to coating.

TREATMENT OF RESIN SURFACES TO IMPROVE THEIR RECEPTIVITY TO COATINGS AND THE LIKE AND RESIN BODIES WITH TREATED SURFACES

FIELD OF THE INVENTION

This invention relates to coating processes including treatment of low-energy polymeric resin bodies to improve their surface receptivity towards coatings and the like and to resin bodies so treated.

BACKGROUND OF THE INVENTION

Resinous materials such as polyethylene and polypropylene have good resistance to electricity, toughness and flexibility. By reason of these and other properties it has been desired to employ such material in numerous relationships where it would be desirable to apply coatings, printing, etc. to the surface of the material.

However, these materials present a waxy, sometimes paraffinlike surface character, i.e. have low-critical surface tension of wetting, which interferes with spreading and adhesion of many commonly employed coating agents.

To improve the ability to spread and adhere coatings, surfaces of materials such as polyethylene have been subjected to various treatments such as flame, corona discharge, chromic acid and so on. However, the results while acceptable for many uses have not been fully satisfactory for more severe requirements.

SUMMARY OF THE INVENTION

It is an object of the present invention to treat surfaces of these low-critical surface tension of wetting materials to enable them to be readily coated to provide strongly adherent coatings.

It is a further object of the invention to provide an article having a main body portion composed of low-critical surface tension of wetting resin and a coating-receptive surface stratum strongly united with the main body of material.

To these ends and in accordance with a feature of the present invention, a photosensitizer is provided at the surface of a body of low surface tension of wetting polymer resin material, the surface is subjected to controlled ultraviolet radiation treatment, and a special surface active agent is deposited on the surface and unites strongly with its to provide a coating-receptive surface stratum on which coatings are readily spread and to which the coatings strongly adhere.

PREFERRED EMBODIMENTS

The process of the present invention is concerned primarily with treating substrates such as polyolefins having a low-critical surface tension of wetting to enable the ready spreading and strong adhesion of coating materials. It has been found that with a photosensitizer at the surface of the substrate, ultraviolet radiation will develop a condition at the surface such that an organic silicon compound, such as a silane applied to the surface will be held strongly, possibly by chemical reaction, and that the surface carrying the strongly held silicon compound has superior receptivity to coatings and the like applied to it. It is emphasized that without the presence of the photosensitizer, strong combination of most organic silicon compounds with the radiated surface is not obtained.

Materials which are treated according to the process of the present invention are low surface tension of wetting substrates which because of this characteristic are difficult to wet with coating agents. Materials ordinarily considered as having low surface energy are those of which the critical surface tension of wetting is about 35 dynes per centimeter or less as determined by contact angle measurements. (See page 20 of Contact Angle, Wettability and Adhesives, No. 43 of the "Advances in Chemistry Series," published 1964 by the American Chemical Society.) Included in the category are polyethylene, polypropylene, copolymers of ethylene and propylene alone or with a very low percentage of a nonconjugated diene, e.g. the commercial terpolymer EPDM comprising about 64 percent ethylene, about 34 percent propylene and about 2 percent 1,4 hexadiene, and fluorine-containing polymers such as polyvinyl fluoride and polyvinylidene fluoride. Polymers for treatment by the present process must have at least some hydrogen on a carbon chain in a repeating unit in the polymer chain.

It is noted that some molded bodies of normally wettable resins even such resins as polyamides and polyesters, may have surfaces with low surface tension of wetting because of parting compounds, mold releases or the like and surfaces of such materials also may be treated to improve their wetting characteristics.

The first step in the process is the treatment of the surface of the material by ultraviolet radiation with an ultraviolet radiation photosensitizer at the surface. Such ultraviolet radiation photosensitizers may be halogenated hydrocarbons such as methylene chloride, trichloroethylene, and chloroform, ketone materials such as benzophenone, acetophenone, benzoin, 2-acetonaphthone or other known photosensitizers such as acenaphthene and fluorene. In general, these materials are excited by ultraviolet radiation and, in excited state, interact with the resin substrate to initiate reactions producing groups which will cooperate to hold silicon compounds. It appears to be important that the photosensitizer have a triplet state energy of at least about 62 K cal./mole. Sensitizers in which carbon atoms are linked to other atoms by multiple bonds as in benzophenone and trichloroethylene are believed to be engrafted into the molecular chain of the resin substrate and may themselves provide groups which will react with silicon compounds. Where trichloroethylene and similar halogen containing photosensitizers are used, it is believed that halogens are commonly combined at the surface of the substrate. This would make the surface more hydrophobic and displace physically held, e.g. absorbed water from the surface so that the silicon compounds can wet the surface more readily without having to displace the absorbed water.

For each photosensitizer there is a range of frequencies of ultraviolet radiation at which it is most effective and other ranges where it is not so effective. For example, benzophenone and some other photosensitizers are effective even where ultraviolet radiation below 2,700 A is employed. However, if the region below 2,700 A is excluded by means of a 9,700 corex filter, most of the sensitizers employed become ineffective. If only the region below 2,300 A is excluded by means of a 7910 Vycor filter, trichloroethylene and benzophenone are still effective. By choice of sensitizer, radiation of the resin can be carried out at a range of wave length of ultraviolet light which is not cancelled by ultraviolet stabilizers.

The photosensitizer is generally applied to the surface of the material in the form of a solution in a volatile solvent in the case of solid photosensitizers or as a pure or diluted liquid in the case of liquid photosensitizers. As little as 2 percent by weight of photosensitizer in the solution applied may be effective; but higher percentages may be used without adverse results. The important factor is presence of the photosensitizer at the surface during ultraviolet radiation and this may be secured by melting and spraying fusible solid photosensitizer on the surface or by other procedures such as dusting on a powder of the photosensitizer. It has even been found that photosensitizers, preferably solid photosensitizers of the ketone type, may be uniformly distributed through the material to be bonded as by milling the photosensitizer into the material. Apparently sufficient of the photosensitizer reaches the surface by migration or otherwise to provide sensitizing action. To be effective in this relation there should be used at least about 0.1 percent by weight of the photosensitizer based on the total weight of the compound. It has been observed with solid photosensitizers that their effectiveness is increased where heat sufficient to fuse the photosensitizer is applied. This may be the heat generated in the course of ultraviolet radiation. Because of this factor it is desirable to use lower melting point photosensitizers to facilitate wetting of the substrate by the photosensitizers. Of course, mixtures of photosensitizers including, for example, high and low-melting point photosensitizers or components which reduce the melting point of the photosensitizer may be used.

Where the surface being treated is an elastomeric material, fusion of the photosensitizer appears to cause the photosensitizer to penetrate into the body of material, and thus avoid presence of excess photosensitizer at the surface which might constitute a weak boundary layer.

Such penetration may not occur with the resinous plastic type of material and it has been found important to wipe the surface after radiation, preferably with a solvent for the photosensitizer to avoid possible weak boundary layers from the presence of residual photosensitizer. This wiping may be a separate step, or, for example, where the silicon compound is applied by wiping or where excess silicon compound on the surface is wiped off, this wiping step may be used to remove undesired residual photosensitizer.

The next step is the treatment of the ultraviolet radiated surface with an organic silicon compound.

Useful organic silicon compounds include organic-silanes having —OH groups or easily broken ether linkages. Preferred silanes will have one or more alkoxy, aryloxy, acyloxy, amino or vinyl groups in them. Organic-silanes having one or more alkoxy groups containing from 1–4 carbon atoms, preferably a methoxy or ethoxy group, or aryloxy groups such as phenoxy or benzoxy groups, or acyloxy groups containing from 1–4 carbon atoms such as acetoxy, formoxy, etc. groups and preferably also containing a vinyl or amino group are found to be especially useful.

The silane may be applied either undiluted in the case of the more freely fluid silanes or as a solution in a suitable organic solvent, e.g. THF, chloroform, hexane and cyclohexane. Aliphatic and aromatic hydrocarbon liquids and halogenated aliphatic and aromatic hydrocarbon liquids generally are useful as well as the common ketone solvents including acetone and methyl ethyl ketone. Solutions may contain as little as 0.25 percent by weight silane but preferably contain from about 1 to about 5 percent silane. Lower alkyl alcohols alone or with added water may also be used.

A preferred composition is a solution of a silane in a 90:10 ethanol and water mixture. As little as 1 percent by weight of the silane has been found effective in this solution but higher percentages may also be used. The water in this mixture converts the silane to the silanol. For example, $\gamma$ aminopropyl triethoxy silane is converted to the silanol, $\gamma$ aminopropyl trihydroxy silane.

The silane may be present at the time of radiation and in this case it would be preferred to use a solution of the silane in a solvent which is itself a photosensitizer, e.g. ethylene dichloride. No special conditions of temperature or time are necessary for the silane treatment and it has been found that the desired results are obtained by merely spreading a solution on the ultraviolet radiated surface and wiping off the excess, although the wiping step can and is often eliminated, the whole treatment being carried out at room temperature.

It is believed that the silane or silanol groups are held on the surface of the radiated resin by a combination of factors. Polarity of OH and other groups on the radiated surface of the polyethylene or other material will provide a force holding the silane or silanol groups. Also such –OH groups may react with –OH groups of a silanol to form a siloxane linkage. It is to be understood that this explanation of the forces is given as of possible assistance in understanding the invention and that patentability is not predicated upon the correctness of the explanation.

Improvement in adhesion through the action of the organic silicon compound on the radiated surface is obtained with a great variety of coatings. All types of paints have been bonded an epoxy, acrylic, nitrocellulose and oil base paints are among those which have been found to be strongly adhered. The radiated and organic silicon compound treated surface also gives improved bonding with adhesive coatings particularly with epoxy resin adhesive and polyamide adhesives. It is considered that the epoxy resin in coatings or adhesives may react with –OH groups of the silicon compound and with amino groups where they are present, and that amino or carboxyl terminal groups of a polyamide resin may not only react with active groups of the organic silicon compound but also form hydrogen bonds. The presence of the silicon compound on the surface is considered to give more effective electrostatic painting since it allows discharge from the surface and hence prevents charge build up which could interfere with deposition.

The following examples are given as of assistance in understanding the invention, but it is to be understood that the invention is not restricted to the particular materials, proportions or procedures set forth in the examples.

EXAMPLE I

Samples of high density polyethylene and polypropylene were given the photosensitizer treatment and radiation treatment set forth in the following table. After radiation, all of the samples were treated with a 5 percent solution of gamma-aminopropyltriethoxy silane dissolved in a 90:10 ethanol/distilled water solvent, all proportions being by weight. Thereafter paint was applied and all samples were given a baking treatment after painting for 30 minutes at 100° C.

| Substrate | Approx. radiation watt sec./ sq. ft. | Sensitizer | Paint type | Percent paint failure (approx.) |
| --- | --- | --- | --- | --- |
| Polyethylene | 48,000 | None | A | 15 |
| Do | 48,000 | None | B | 10 |
| Polypropylene | 48,000 | None | A | 60 |
| Do | 48,000 | None | B | 20 |
| Polyethylene | 22,200 | None | A | 50 |
| Do | 22,200 | None | B | 65 |
| Polypropylene | 22,200 | None | A | 45 |
| Do | 22,200 | None | B | 40 |
| Polyethylene | | None | A | 75 |
| Do | | None | B | 80 |
| Polypropylene | | None | A | 100 |
| Do | | None | B | 100 |
| Polyethylene | 800 | TCE* | A | 0 |
| Do | 800 | TCE* | B | 0 |
| Polypropylene | 800 | TCE* | A | 0 |
| Do | 800 | TCE* | B | 0 |

*Trichloroethylene wiped on surface before radiation.
(A) GM auto touch-up, made from duPont Lucite® acrylic lacquer No. 4600-LM.
(B) duPont spray paint of the following composition:

| | Percent |
| --- | --- |
| Composition: | |
| Propellant | |
| Dichlorodifluoromethane | 46 |
| Lacquer enamel | 54 |
| Total | 100 |
| Composition of Lacquer Enamel: | |
| Titanium dioxide | 3.0 |
| Zinc dioxide | Trace |
| Tinting colors | 2.0 |
| Cellulose nitrate, estergum coconut oil modified alkyd, plasticizer | 17.0 |
| Ketones, esters, alcohols, aromatic and aliphatic hydrocarbons | 78.0 |

The results in the table show that for both polyethylene and polypropylene greatly superior results are obtained when a sensitizer is used with the irradiation treatment. Specifically, the presence of the trichloroethylene photosensitizer increased and adhesion of the applied paint more than 60-fold and even a long term duration of exposure, i.e. 48,000 watt Seconds/Sq. Ft. did not give the result obtained with the photosensitizer in an 800 Watt Second/Sq. Ft. radiation.

EXAMPLE II

Samples of high density polyethylene and of polypropylene were brushed with trichloroethylene and subjected to 1760 watt seconds per square foot ultraviolet radiation. This involved radiation for 10 seconds with a 1500 watt ultraviolet lamp at a distance of 3 inches. After radiation the samples were treated with 5 percent solutions of gamma-aminopropyltriethoxy silane dissolved in mixtures of ethanol and distilled water. The mixtures of ethanol and distilled water were respectively, 99 percent, 95 percent, 90 percent, 80 percent, 50 percent and 25 ethanol with the balance being distilled water. Thereafter a series of paints were applied to separate samples including a nitrocellulose lacquer and acrylic lacquer, a two-part epoxy resin base paint, a black enamel of which the vehicle was a soya alkyd resin, an enamel primer followed by an acrylic lacquer topcoat. After application of the paint the samples were given a baking treatment for 30 minutes at 100° C.

In every case the applied paint adhered firmly.

EXAMPLE III

Samples of polyethylene and polypropylene were brushed with trichloroethylene and subjected to ultraviolet radiation to the extent of 1,760 watt seconds per square foot. Thereafter, surfaces of the samples were brushed with a 5 percent solids solution of n-(trimethoxysilylpropyl) ethylene diamine. A nitrocellulose lacquer, a red pigmented acrylic lacquer and a black enamel were applied to separate radiated, coated samples and silane treated samples and the samples were baked for 30 minutes at 100°C.

In every instance a strong, firmly adherent, uniform coating was obtained.

EXAMPLE IV

Samples of high density polyethylene and polypropylene were treated with trichloroethylene and subjected to ultraviolet radiation as in example III and thereafter brushed with a 5 percent weight solids solution of vinyl triethoxy silane in a 90:10 ethanol/distilled water solvent, the proportions being by weight.

Paints were applied to the treated samples and baked as in example III. The paint coatings adhered firmly to the treated surfaces.

EXAMPLE V

A commercial silicone primer known as AP–131 sold by Union Carbide Corporation having a 5 percent by weight solids content, a viscosity at 25° C. of 2 centistokes and a specific gravity of 0.87 and using a solvent mixture comprising by weight 90 percent toluol, 5 percent ethylene glycol monobutyl ether and 5 percent of n-butanol was applied to samples of polyethylene and polypropylene which had been treated with photosensitizer and radiated as in example III. Thereafter, paint coatings were applied as in Example III and baked for 30 minutes at 100° C. The paint coatings adhered firmly to the treated surface.

EXAMPLE VI

Samples of high density polyethylene and polypropylene were given the photosensitizer and radiation treatment as in example III and the surfaces were brushed with a 5 percent by weight solids solution of gamma methoxypropyl trimethoxy silane in a mixture of ethanol and distilled water in the ratio by weight of 90:10.

The two parts of a commercial epoxy resin paint comprising epoxy resin in one part and an amine curing agent in the other were mixed and applied to the treated surfaces of the samples.

After standing 24 hours, a very strongly adherent coating was formed on the surfaces of the treated samples.

EXAMPLE VII

The procedure of example VI was repeated with the substitution for the silane solution of that example of a 5 percent solids solution of vinyl-tris($\beta$-methoxy ethoxy) silane in a mixed solvent composed of 90 parts by weight of ethanol and 10 parts by weight of distilled water.

The epoxy coating was strongly adherent to the treated surface of the samples in 24 hours.

EXAMPLE VIII

The procedure of example VI was repeated using a 5 percent by weight solution of gamma-glycidoxypropyl trimethoxy silane in a mixed solvent comprising 90 parts by weight of ethanol and 10 parts by weight of distilled water.

The cured epoxy coating was very strongly adherent to the treated surfaces.

EXAMPLE IX

The procedure of example VI was repeated using a solution of 5 percent by weight of diphenyl silane diol in substantially anhydrous ethanol.

The coating after 24 hours cure was strongly adherent to the treated surfaces of the samples.

EXAMPLE X

The procedure of example VI was repeated using a 5 percent by weight solution of vinyl triacetoxy silane in a mixed solvent comprising 90 parts by weight of ethanol and 10 parts by weight of distilled water. In this instance a black enamel (soya alkyd resin vehicle), rather than epoxy resin paint was applied to the silane treated surface and the samples were baked for 30 minutes at 100°C.

The enamel coating was very strongly adherent to the treated surface.

EXAMPLE XI

The procedure of example VI was repeated with application of a 5 percent by weight solids solution of phenyl trimethoxy silane in a mixture of 90 parts by weight of ethanol and 10 parts by weight of distilled water to the radiated surface.

A two-part epoxy paint was applied to the treated surfaces of the samples. After 24 hours a thorough cured strongly adherent coating was formed.

EXAMPLE XII

The procedure of example VI was repeated using a 5 percent by weight solution of gamma-chloropropyl trimethoxy silane in a mixed solvent comprising 90 parts by weight of ethanol and 10 parts by weight of distilled water. A two-part epoxy paint was applied to the radiated, silane treated surfaces of the samples and the samples stored for 24 hours at room temperature. A strongly adherent fully cured coating was formed on the surfaces of the samples.

Having thus described my invention what I claim as new and desire to secure by Letters Patent of the United States is:

I claim:

1. The process for treating a body of a polymer resin from the group consisting of polyolefins, copolymers of ethylene and propylene, copolymers of ethylene, propylene and a low percentage of a nonconjugated diene, polyvinyl fluoride, polyvinylidene fluoride, polyamides and polyesters, said resin having at least some hydrogen on a carbon chain in a repeating unit in the polymer chain and having a surface with a low critical surface tension of wetting to improve the surface receptivity of the surface for coatings, said process comprising the steps of radiating a surface of said body with ultraviolet radiation and with a photosensitizer present at said surface during radiation, said photosensitizer having a triplet state energy of at least about 62 K cal./mol and thereafter applying an organic silicon compound to said surface to create improved surface receptivity towards coatings, said organic silicon compound being a silane containing at least one member of the group consisting of alkoxy, aryloxy, acyloxy, amino and vinyl groups.

2. The process for treating a body of polymer resin as defined in claim 1 in which residual photosensitizer is removed from the surface of the body after radiation.

3. The process of treating a body of polymer resin as defined in claim 1 in which said silane is applied to the radiated surface as a solution in a volatile organic solvent.

4. The process for treating a body of polymer resin as defined in claim 3 in which said silane is applied to the surface of said body of polymer resin as a solution containing at least about 1 percent by weight of the silane in a solvent comprising lower alkyl alcohol and containing at least about 1 percent by weight of water based on the weight of the alcohol.

5. The process for treating a body of a polymer resin as defined in claim 1 in which a coating is applied to the surface of said body carrying the silane.

6. The process for treating a body of a polymer resin as defined in claim 2 in which a coating is applied to the surface of said body carrying the silane.

7. The process for treating a body of a polymer resin as defined in claim 6 in which said silane contains an amino group and the coating includes an epoxy resin.

8. A body of polymer resin from the group consisting of polyolefins, copolymers of ethylene and propylene, copolymers of ethylene, propylene and a low percentage of a nonconjugated diene, polyvinyl fluoride, polyvinylidene fluoride, polyamides and polyesters, said resin having at lest some hydrogen on a carbon chain in a repeating unit in the polymer chain and having a surface with a low critical surface tension of wetting, said body having a surface having high receptivity or coatings through combination of an organic silicon compound with surface portions radiated with ultraviolet in the presence of a photosensitizer said organic silicon compound being a silane containing at least one member selected from the group consisting of alkoxy, aryloxy, acyloxy, amino and vinyl groups and said photosensitizer having a triplet state energy of at least about 62 K cal./mol.

9. A body of polymer resin as defined in claim 8 in which said silane was applied to the surface of said body of polymer resin as a solution of the silane in a solvent comprising a lower alkyl alcohol and water.

* * * * *